E. F. COPELAND.
LAWN MOWER.
APPLICATION FILED JULY 30, 1920.
1,403,895.
Patented Jan. 17, 1922.
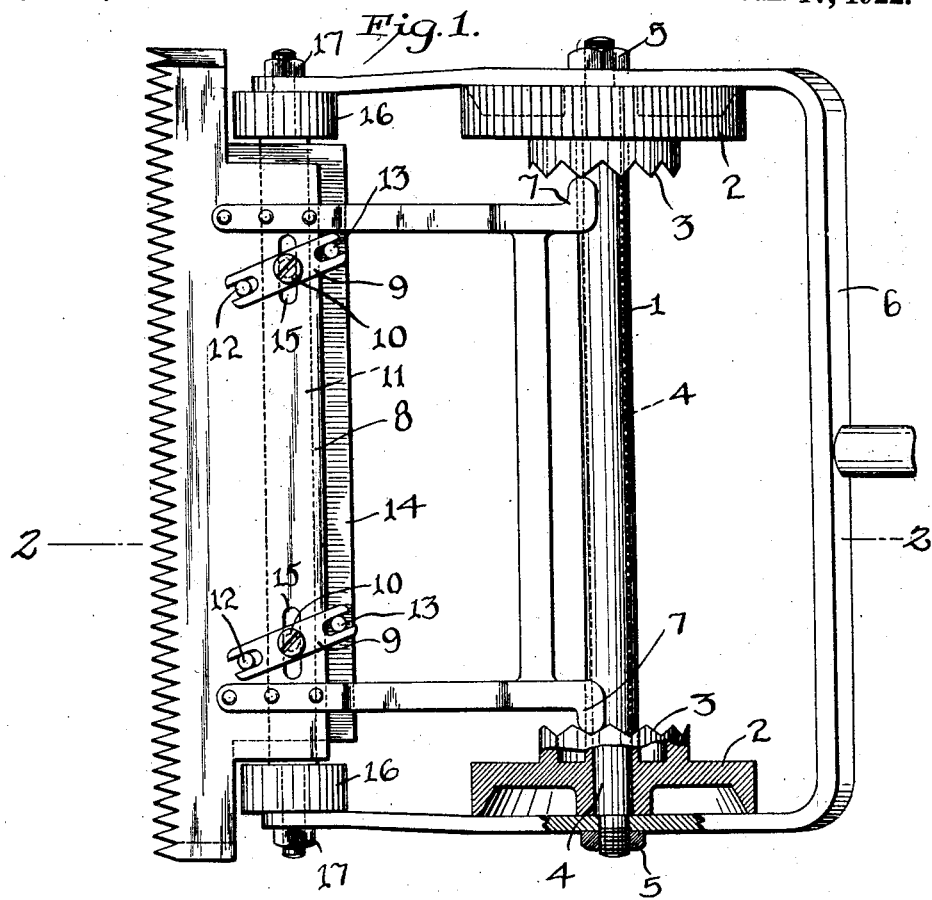
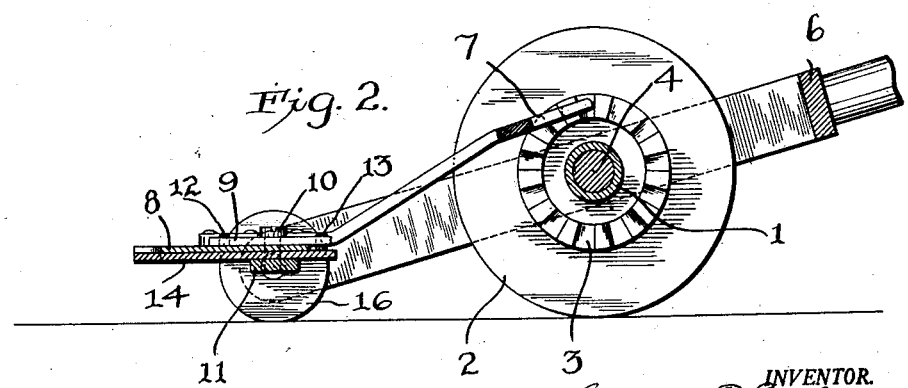
INVENTOR.
Edward F. Copeland
BY
ATTORNEY.

UNITED STATES PATENT OFFICE.

EDWARD F. COPELAND, OF NEW YORK, N. Y.

LAWN MOWER.

1,403,895. Specification of Letters Patent. Patented Jan. 17, 1922.

Application filed July 30, 1920. Serial No. 400,166.

*To all whom it may concern:*

Be it known that I, EDWARD F. COPELAND, a citizen of the United States, and a resident of the borough of Manhattan, in the city of New York, county and State of New York, have invented certain new and useful Improvements in Lawn Mowers, of which the following is a specification.

The present invention relates generally to lawn mowers and has more particularly reference to a device that will cut tall grass or brush without choking up the device. The invention consists in the hereinafter described features of construction, arrangement of parts and coordination of elements, a preferred form of which is disclosed in the accompanying drawings.

In said drawings:

Fig. 1 is a top plan view of a mower embodying the invention, with parts broken away and in section.

Fig. 2 is a longitudinal sectional view on the line 2—2 of Fig. 1.

The cutting mechanism consists of two superposed blades 8 and 14 that extend transversely of the direction of movement of the mower, and which are provided with cutting teeth in their front edges as shown. Reciprocating cutting action at right angles to the direction of movement of the mower is imparted to this cutting mechanism by actuating one or both blades, and the actuating mechanism may in the case of a motor driven mower be any rotatable element, and in a manually or horse-drawn mower it will be the traction wheels or elements driven thereby. If both blades are actuated they will be oppositely reciprocated with respect to each other. In the preferred embodiment herein disclosed, the construction is as follows. Suitable supporting means such as frame 6, tie rod 11 and nuts 17 are provided, the superposed blades being mounted on tie rod 11 by means of upright pins 10 on the rod that pass through elongated slots 15 in the blades. Mounted on pins 10 are oscillating members 9 the opposite ends of which engage pins 12 and 13 on the two blades, so that when one blade is moved in one direction the other blade moves in the opposite direction. Extending rearwardly from blade 8 are two levers 7, connected by a tie rod as shown, the rear ends of which are turned outwardly to engage rotatable cams 3. The high and low points of the two cams are, with respect to each other, staggered circumferentially so that by the rotation of said cams a reciprocating motion is imparted to upper blade 8 and thence, in an opposite direction, to lower blade 14. Cams 3 are conveniently integral with traction wheels 2, and the latter are in turn part of a sleeve 1 rotatably mounted on core shaft 4 held in position in member 6 by means of nuts 5. Preferably, also, tie rod 11 is provided with traction wheels or rollers 16 of smaller diameter than wheels 2.

It will be understood that by reason of the projecting blades grass may be cut very close to an upstanding object such as a tree or a fence, and also that the height of the grass to be cut is immaterial as there is no rotatable cutting member in which it can become entangled.

I claim:

1. A lawn mower comprising: supporting means, traction wheels, a cutting mechanism including a pair of superposed blades extending transversely of the direction of movement of the mower, means for reciprocating one of said blades, and means actuated from said first blade, for oppositely reciprocating the other blade.

2. In a lawn mower, two superposed cutting blades, means for reciprocating one of said blades, and oscillating means actuated by the first blade for oppositely reciprocating the other blade from the first one.

3. A lawn mower comprising supporting means, traction wheels, two superposed cutting blades, a rotatable cam and connections for reciprocating one of said blades, and oscillating means actuated by the first blade for oppositely reciprocating the other blade from the first one.

4. A lawn mower comprising: supporting means, traction wheels, cams on the traction wheels, a reciprocating cutting blade actuated from said cams, another cutting blade in contact with the first one, and oscillating members mounted on the support for transmitting the reciprocating motion of the first blade in an opposite direction to the other blade.

Signed at New York city, in the borough of Manhattan, county and State of New York, this 29th day of July, 1920.

EDWARD F. COPELAND.